Figure 1:
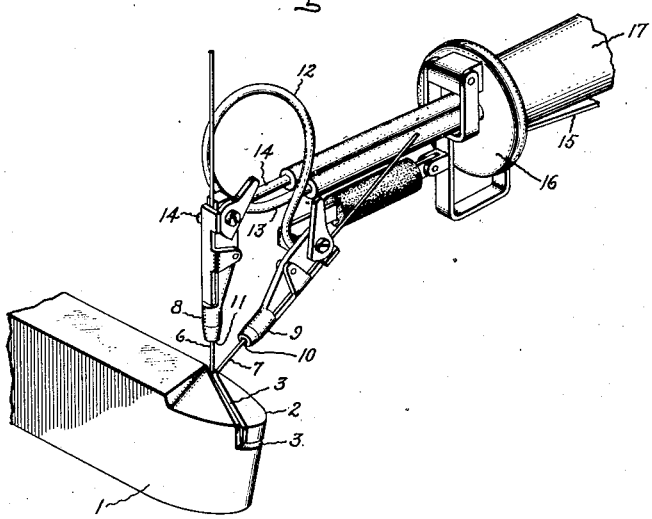

March 14, 1933.                T. KERR                1,901,654

CUTTING TOOL AND PROCESS OF MAKING IT

Filed Jan. 31, 1929

Inventor:
Thomas Kerr,
by Charles E. Tullar
His Attorney.

Patented Mar. 14, 1933

1,901,654

UNITED STATES PATENT OFFICE

THOMAS KERR, OF SCHENECTADY, NEW YORK, ASSIGNOR TO GENERAL ELECTRIC COMPANY, A CORPORATION OF NEW YORK

CUTTING TOOL AND PROCESS OF MAKING IT

Application filed January 31, 1929. Serial No. 336,551.

The present invention relates to metal cutting tools and to an improved method for securing to a steel shank a tool tip consisting of a sintered composition of tungsten-carbide and cobalt, such for example, as described in United States patent to Schröter No. 1,549,615 and United States Patent 1,721,416, Schröter, filed April 26, 1926 and entitled "Hard metal composition." Ordinarily such tips are brazed to the tool shank with copper or brass. Under heavy cuts and at high speeds the tips become heated to a high temperature and the copper or brass sometimes melts causing separation of the tip from the shank.

Present brazing methods require furnace equipment and on account of the softening of the brazing metal, it is necessary to employ large tool tips. Many attempts have been made to weld tips of the character described in the above patent and application, to steel shanks but prior to the present invention such attempts have been generally unsuccessful. For example, such tips have been welded onto steel shanks by ordinary methods of pressure welding using nickel, iron and Monel welding metals and have even been secured to the supporting shank by some one of the cements which have heretofore been employed to secure a union between steel parts. Welded joints made in this manner appear to be perfect mechanically but invariably fail during the use of the tool when high temperatures and pressures are generated. This failure, in my opinion, is due to the rigidity to the usual welded joint and to the thermal stresses which arise from the heat developed in the tip. For example, with the ordinary welded joint the entire surface of the tip which is in contact with the shank is secured to the shank by welding metal. When taking a heavy or fast cut the great amount of heat developed in the tip causes it to expand. Owing to the rigidity and extent of the welded junction however, this expansion is prevented and as a result the tip will break.

In carrying my invention into effect, I insert the tool tip in a recess in the supporting shank and weld the tip to the shank, employing an atomic hydrogen arc torch and an ordinary iron welding rod. The tip and shank may be bevelled on their adjacent exposed edges to provide a V or U-shaped continuous groove to accommodate the iron welding material. The tip is secured to the shank merely at the edge portions of the tip and not over the entire juxtaposed surfaces of the tip and shank. Although the abutting surfaces of the tip and shank are apparently in contact there is nevertheless a minute space between them. When the tip therefore is fastened at its edge portions only and there is a difference in expansion between the tip and the shank the central portion of the tip may move slightly inwardly or outwardly. Any inward or outward movement of the central portion of the tip is necessarily of very minute proportions. Such movement however is sufficient to prevent the tip from cracking as is sometimes the case where the abutting surfaces of the tip and shank are welded together. If desired, a flux may be employed in the welding operation although its use is not absolutely necessary. An oxy-acetylene torch may be employed to weld the tip to the shank. However, by employing an atomic hydrogen flame a great amount of heat may be concentrated on a small area and the welding operation completed in a relatively short period of time. The atomic gas flame, when applied for such a short period of time, does not adversely affect either the composition or the subsequent performance of the tool tip and when the latter is secured to the shank with iron welding material a rugged joint is provided which is capable of withstanding without deterioration the intense heat developed in taking heavy metal cuts. Moreover, on account of the rugged connection between the tip and shank, the amount of material in the tip may be substantially less than the amount employed when tips are copper or brass brazed to the shank. After the tip is secured to the shank, the tip and adjacent end portion of the shank are heated to a uniform red heat and the entire tool buried in asbestos shavings or like material, which has a relatively low heat conductivity, and allowed to cool slowly.

Figure 2:
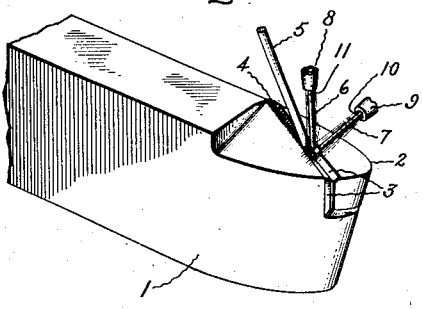

The novel features which I believe to be characteristic of the invention are set forth with particularity in the appended claims. The invention itself however will best be understood with reference to the following specification when considered in connection with the accompanying drawing in which Fig. 1 is a perspective view partly broken away of a tool shank and tip and an atomic hydrogen torch for securing the tip to the shank, while Fig. 2 is a perspective detail view illustrating the application of welding material to the tool tip and shank.

Referring more particularly to the drawing, I have indicated at 1 a portion of a tool shank, which may be steel, recessed at its upper end portion and having a tool tip 2 fitted in the recess. The tip 2 which is made from powdered materials mixed together and sintered, consists largely of a carbide of an element of the 6th group of Mendeléeff's periodic table, such as tungsten-carbide, and an appreciable amount of an element of the iron group, such as cobalt. A composition of this character is disclosed in the above-mentioned Schröter patent and application. The composition may be made in various ways, one of which is disclosed in the Schröter Patent No. 1,549,615. The copending United States patent application of Samuel L. Hoyt, Serial No. 181,536, filed April 6, 1927, now Patent No. 1,843,768 discloses a second method for making the tool tip, the latter method comprising the simultaneous application of pressure and heat to a powdered mixture consisting largely of tungsten-carbide but containing an appreciable amount of cobalt, while in the copending United States patent application of Emery G. Gilson, Serial No. 187,328, filed April 28, 1927, now Patent No. 1,756,857, a third method for making the tip is disclosed which comprises simultaneously applying heat and pressure to three powdered materials such as tungsten, carbon and cobalt. The auxiliary metal in the composition, for example cobalt, may constitute about 25% of the total content of the composition but will usually vary between 5 and 15% of the total content. It is desirable to make the tip 2 somewhat thick so that the welded portions of the tip are not closely adjacent the cutting edge which may be subjected to very high temperatures. The adjacent exposed edges of the tip and shank are bevelled as indicated at 3, to provide a V or U-shaped continuous groove to accommodate welding material 4 which may be supplied for an ordinary iron welding rod 5 consisting of substantially pure iron but containing small amounts of carbon, silicon and manganese.

The arc apparatus comprises a pair of electrodes 6 and 7 between which an arc may be established. The electrodes are mounted respectively in holders 8 and 9 which are inclined at any convenient angle to one another and so adjusted that the electrodes can be brought into contact with one another at a point which is exposed to a blast of gas discharged from orifices 10 and 11 in the electrode holders. Holder 9 is mounted on the end of a U-shaped spring tube 12 which forms a continuation of a tube 13 while the electrode holder 8 is mounted on the end of a tube 14. Gas is supplied to holders 8 and 9 through the tubes 14 and 12 and discharged about the electrodes, the stream of gas from the holders producing a resultant blast of gas which may be directed towards the work to be welded. When hydrogen gas is employed the molecular hydrogen is converted at the arc into atomic hydrogen which is blown in a definite direction towards the work. The atomic hydrogen forms a flame which can be brought into contact with the metal to be welded, the recombination of the hydrogen atoms releasing heat which accomplishes the welding operation. The jets of hydrogen discharged from holders 8 and 9 bathe all heated parts of the electrodes and the work in a non-oxidizing or active reducing atmosphere and thus prevent oxidation of the tool tip and the inclusion of nitrogen compounds in the weld. In this manner a ductile weld may be provided. Electrodes 6 and 7 may be separated by the application of pressure to a lever 15 mounted on a flange 16 attached to a handle 17 surrounding the gas supply tubes 13, 14. Current is supplied to the electrodes through wires (not shown) which extend through the gas supply pipes 13 and 14 and are connected to electrodes 7 and 6 respectively.

To weld the tip 2 to the shank 1 the tip is placed in the recessed portion of the shank and clamped thereto in any convenient manner. The atomic gas flame is played over the edge portions of the shank adjacent the tip until those edge portions are heated substantially to a condition of flow. An iron welding rod 5 consisting mainly of pure iron but containing about .10% carbon, .20% silicon and .30% manganese is then held in the rear of the torch as the latter is moved entirely around the continuous groove formed by the bevelled edges 3. The welding rod melts and flows into the groove thereby securely binding the tip to the shank.

After the welding operation is completed the tip and the portion of the shank adjacent the tip are heated to a red heat either by an oxy-acetylene flame or by the application of the atomic gas arc to those portions. The tool, while at this temperature, is buried in asbestos shavings or like material and allowed to cool very slowly to room temperature. I have found it preferable to cool the shank and tip in this manner rather than in a furnace. In the latter case strains are apparently set up which cause the tip to check or crack off. This difficulty is avoided by cooling the tool slowly in asbestos shavings.

In the welding operation, I prefer to employ an iron welding rod which is melted and flowed into the groove between the tip and the shank. However, the use of a welding rod may be omitted if desired and the tip secured to the shank merely by heating the shank and tip at their contact edges to a welding temperature.

Although it is desirable to heat the tool shank and bit after the welding operation has been completed, such a step is not necessary since the welding operation itself causes the tip and adjacent portion of the tool shank to become heated to a very high temperature, and if desired the tip and shank may be buried in asbestos shavings immediately after the welding operation and the subsequent heating operation omitted.

While I have employed a commercial, mild steel or iron welding rod having a fusing temperature higher than that of copper, i. e., about 1530° C., other welding rods may be employed if desired. For example, a Stellite rod consisting of chromium, tungsten and cobalt and having a fusing temperature of about 1300° C. has been found to give satisfactory results.

What I claim as new and desire to secure by Letters Patent of the United States is:

1. In combination, a tool comprising a shank portion and a cutting tip, said tip consisting largely of a carbide of metal from a group consisting of tungsten and molybdenum but containing an appreciable amount of an element of the iron group, the juxtaposed surfaces of said tip and shank being in substantially parallel planes, said tip being welded to said shank only at the exposed edge portions of said tip.

2. In combination, a tool comprising a steel shank and a tool tip consisting largely of a carbide of metal from a group consisting of tungsten and molybdenum but containing an appreciable amount of an element of the iron group, said tip being mounted on said shank so as to provide a minute space between the juxtaposed surfaces of the tip and shank, said tip being welded to said shank only at edge portions of the tip whereby the tip may expand and contract substantially unrestrained by the shank.

3. In combination, a tool comprising a supporting shank and a tool tip, said tip consisting largely of tungsten-carbide but containing an appreciable amount of cobalt, the juxtaposed surfaces of said tip and shank being in substantially parallel planes, said tip being welded to the shank only at edge portions of said tip.

4. In combination, a tool comprising a steel shank having a recessed portion and a tool tip positioned in said recess, said tip consisting largely of tungsten-carbide but containing an appreciable amount of cobalt, the juxtaposed surfaces of said tip and shank being in substantially parallel planes, the adjacent exposed edges of said tip and shank being bevelled slightly to provide a shallow groove, said groove containing a welding metal.

5. In combination, a tool comprising a steel shank having a recessed portion and a tool tip positioned in said recess, said tip containing an appreciable amount but not more than 25% cobalt, the remainder of the tip consisting mainly of tungsten-carbide, the juxtaposed surfaces of said tip and shank being in substantially parallel planes, the adjacent exposed edges of the tip and shank being bevelled slightly to provide a shallow continuous groove, said groove containing a welding metal.

6. In combination, a tool comprising a steel shank having a recessed portion and a tool tip mounted in said recessed portion, the juxtaposed surfaces of said tip and shank being in substantially parallel planes, the shank and tip at adjacent exposed edges being bevelled slightly to provide a shallow continuous groove, said groove containing a welding metal.

7. In combination, a tool comprising a steel shank and a tool tip mounted thereon, the juxtaposed surfaces of said tip and shank being in substantially parallel planes, the tip being secured to the shank at edge portions of the shank only by a welding metal having a higher melting point than copper.

8. The method of securing a tool tip, consisting largely of a carbide of metal from a group consisting of tungsten, and molybdenum but containing an appreciable amount of an element of the iron group, to a supporting shank, which comprises placing the tip on the shank so that the juxtaposed surfaces of the tip and shank are in substantially parallel planes, and locally heating the shank and tip at their contact edges to a welding temperature.

9. The method of securing a tool tip, consisting of a carbide of metal from a group consisting of tungsten and molybdenum but containing an appreciable amount of an element of the iron group, to a tool shank, which comprises providing a recess in the shank, mounting the tip in the shank so that the juxtaposed surfaces of the tip and shank are in substantially parallel planes, locally heating the adjacent edge portions of the shank and tip to a welding temperature and applying molten metal to the junction of the tip and shank.

10. The method of securing a tool tip, consisting of a carbide of metal from a group consisting of tungsten and molybdenum but containing an appreciable amount of an element of the iron group, to a tool shank, which comprises providing a recess in the shank, providing the shank and tip with bevelled edges which will coact with one another and thereby provide a groove, mounting the tip in the shank, heating the adjacent edge portions of the shank and tool to an elevated temperature by an atomic gas flame, applying molten ferrous metal to said groove and slowly cooling the tip and shank in material having relatively low heat conductivity.

11. The method of securing a tool tip, consisting of a carbide of metal from a group consisting of tungsten and molybdenum but containing an appreciable amount of an element of the iron group, to a tool shank, which comprises providing a recess in the shank, mounting the tip in the shank, heating the adjacent edge portions of the shank and tool to an elevated temperature by an atomic gas flame, applying molten ferrous metal to the junction of the tip and shank, reheating the tip and a substantial portion of the shank to a relatively high temperature and slowly cooling the tip and shank in a material of relatively low heat conductivity.

In witness whereof, I have hereunto set my hand this 30th day of January, 1929.

THOMAS KERR.